US012464235B2

(12) United States Patent
Tanaka

(10) Patent No.: US 12,464,235 B2
(45) Date of Patent: Nov. 4, 2025

(54) LIGHT RECEIVING ELEMENT, IMAGING DEVICE, AND CORRECTION PROCESSING METHOD

(71) Applicant: SONY SEMICONDUCTOR SOLUTIONS CORPORATION, Kanagawa (JP)

(72) Inventor: Masanori Tanaka, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 200 days.

(21) Appl. No.: 18/259,317

(22) PCT Filed: Nov. 18, 2021

(86) PCT No.: PCT/JP2021/042348
§ 371 (c)(1),
(2) Date: Jun. 26, 2023

(87) PCT Pub. No.: WO2022/149353
PCT Pub. Date: Jul. 14, 2022

(65) Prior Publication Data
US 2024/0064401 A1     Feb. 22, 2024

(30) Foreign Application Priority Data
Jan. 5, 2021 (JP) ................. 2021-000396

(51) Int. Cl.
*H04N 23/67*     (2023.01)
*H10F 39/00*     (2025.01)

(52) U.S. Cl.
CPC ....... *H04N 23/672* (2023.01); *H10F 39/8053* (2025.01); *H10F 39/8057* (2025.01); *H10F 39/8063* (2025.01)

(58) Field of Classification Search
None
See application file for complete search history.

(56) References Cited

U.S. PATENT DOCUMENTS 9,025,060 B2 * 5/2015 Nishio ................ H10F 39/8063
                                                                             257/435
2012/0249846 A1 * 10/2012 Nishio ................ H10F 39/8053
                                                                        348/E5.045

(Continued)

FOREIGN PATENT DOCUMENTS

| JP | 2018-201015 A | 12/2018 |
| JP | 2019-140696 A | 8/2019 |
| WO | 2017/212909 A1 | 12/2017 |

OTHER PUBLICATIONS

International Search Report and Written Opinion of PCT Application No. PCT/JP2021/042348, issued on Jan. 25, 2022, 08 pages of ISRWO.

*Primary Examiner* — Cynthia Segura
(74) *Attorney, Agent, or Firm* — CHIP LAW GROUP

(57) ABSTRACT

There is provided a light receiving element capable of obtaining a signal with high autofocus performance while suppressing image quality degradation, an imaging device, and a correction processing method. The light receiving element includes a first pixel that includes a plurality of photoelectric conversion units that shares a first on-chip lens, receives incident light from a pupil region of an optical system via the first on-chip lens, and performs photoelectric conversion, and a second pixel that includes a plurality of photoelectric conversion units that shares a second on-chip lens, receives the incident light from the pupil region of the optical system via the second on-chip lens, and performs the photoelectric conversion. The second pixel has lower transmittance on an outer side of the pupil region in which the (Continued)

first pixel is capable of receiving light as compared with the transmittance of the pupil region.

17 Claims, 11 Drawing Sheets

(56) References Cited

U.S. PATENT DOCUMENTS

| | | | |
|---|---|---|---|
| 2016/0173857 A1* | 6/2016 | Yamazaki | H04N 25/70 |
| 2020/0235148 A1 | 7/2020 | Shim | |
| 2020/0243578 A1 | 7/2020 | Pyo et al. | |
| 2023/0071795 A1* | 3/2023 | Watanabe | G01S 17/894 |
| 2023/0137218 A1* | 5/2023 | Hou | H04N 25/75 |
| | | | 348/308 |
| 2023/0138982 A1* | 5/2023 | Yang | H10F 39/813 |
| | | | 257/291 |
| 2024/0243145 A1* | 7/2024 | Nakata | H10F 39/8057 |

* cited by examiner

FIG. 4
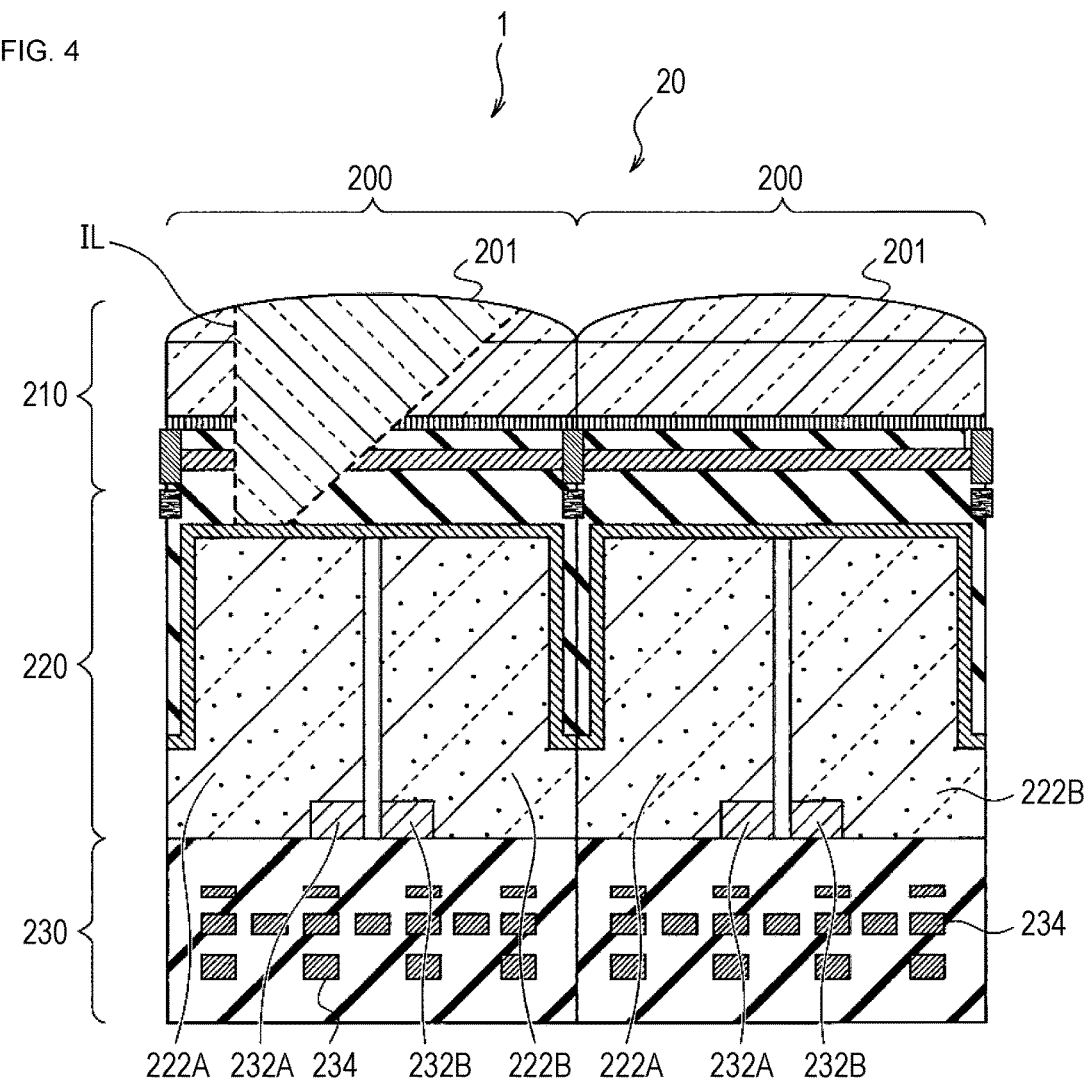
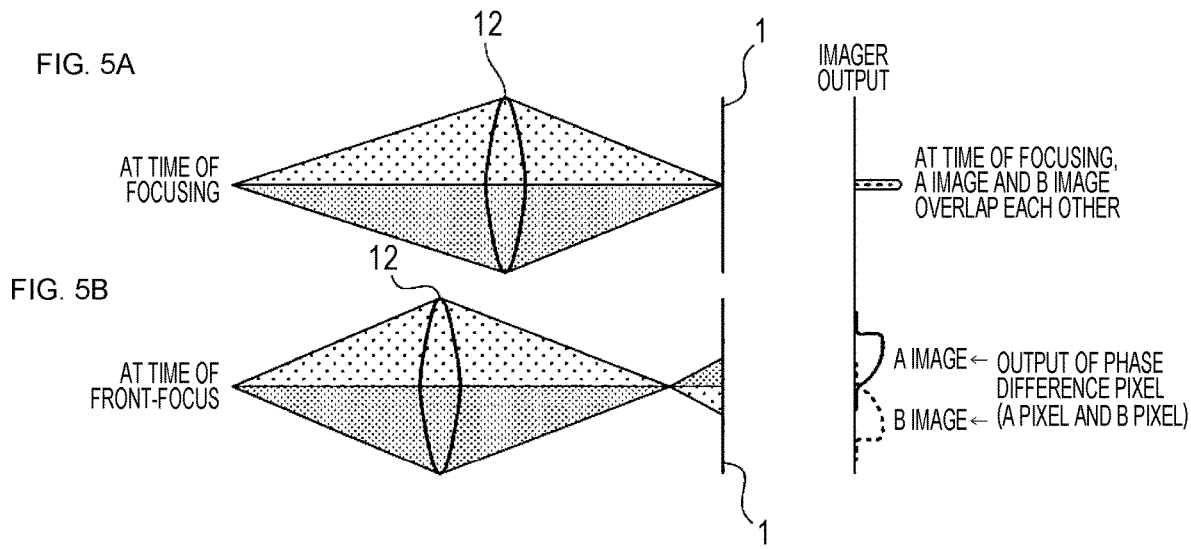
FIG. 5A
FIG. 5B

LIGHT RECEIVING ELEMENT, IMAGING DEVICE, AND CORRECTION PROCESSING METHOD

CROSS REFERENCE TO RELATED APPLICATIONS

This application is a U.S. National Phase of International Patent Application No. PCT/JP2021/042348 filed on Nov. 18, 2021, which claims priority benefit of Japanese Patent Application No. JP 2021-000396 filed in the Japan Patent Office on Jan. 5, 2021. Each of the above-referenced applications is hereby incorporated herein by reference in its entirety.

TECHNICAL FIELD

The technology (present technology) according to the present disclosure relates to a light receiving element, an imaging device including the light receiving element, and a correction processing method.

BACKGROUND ART

In recent years, in order to improve a speed of auto-focus (AF), there has been used a solid-state imaging device in which image plane phase difference detection pixels are disposed. In this type of solid-state imaging device, in order to pupil-split light condensed by an on-chip lens, a method of partially shielding light with a metal film or the like is often adopted and is common. However, information obtained by a light-shielding pixel cannot be used as information of a captured image, and thus interpolation needs to be performed using information obtained from peripheral pixels.

Furthermore, the solid-state imaging device in which the image plane phase difference detection pixels are disposed has poor pupil division performance with respect to a single-lens reflex AF sensor, does not have a correlation at the time of large defocus (large blur), is difficult to perform AF, and causes a decrease in accuracy.

Therefore, in the related art, in order to enhance pupil division, a structure in which a dead zone extends in a center direction of a pixel has been proposed (For example, Patent Document 1).

CITATION LIST

Patent Document

Patent Document 1: Japanese Patent Application Laid-Open No. 2018-201015

SUMMARY OF THE INVENTION

Problems to be Solved by the Invention

However, in the above-described structure, when the extension is intensified, the quality of a captured image is deteriorated, and when the extension is weakened, it is difficult to achieve both the imaging performance and the pupil division performance since it is difficult to obtain the pupil division effect.

The present disclosure has been made in view of such circumstances, and an object of the present disclosure is to provide a light receiving element capable of obtaining a signal with high autofocus performance while suppressing image quality degradation, an imaging device, and a correction processing method.

Solutions to Problems

According to an aspect of the present disclosure, there is provided a light receiving element including: a first pixel that includes a plurality of photoelectric conversion units configured to share a first on-chip lens, receive incident light from a pupil region of an optical system via the first on-chip lens, and perform photoelectric conversion; and a second pixel that includes a plurality of photoelectric conversion units configured to share a second on-chip lens, receive the incident light from the pupil region of the optical system via the second on-chip lens, and perform the photoelectric conversion, in which the second pixel has lower transmittance on an outer side of the pupil region in which the first pixel is capable of receiving light as compared with the transmittance of the pupil region.

According to another aspect of the present disclosure, there is provided an imaging device including a light receiving element, the light receiving element including: a first pixel that includes a plurality of photoelectric conversion units configured to share a first on-chip lens, receive incident light from a pupil region of an optical system via the first on-chip lens, and perform photoelectric conversion; and a second pixel that includes a plurality of photoelectric conversion units configured to share a second on-chip lens, receive the incident light from the pupil region of the optical system via the second on-chip lens, and perform the photoelectric conversion, in which the second pixel has lower transmittance on an outer side of the pupil region in which the first pixel is capable of receiving light as compared with the transmittance of the pupil region.

Moreover, according to still another aspect of the present disclosure, there is provided a correction processing method for a pixel signal of a light receiving element, the method including: outputting pixel signals including an object in a predetermined imaging field of view, which are obtained by a first pixel that includes a plurality of photoelectric conversion units configured to share a first on-chip lens, receive incident light from a pupil region of an optical system via the first on-chip lens, and perform photoelectric conversion, and a second pixel that includes a plurality of photoelectric conversion units configured to share a second on-chip lens, receive the incident light from the pupil region of the optical system via the second on-chip lens, and perform the photoelectric conversion; and correcting the pixel signal output from the first pixel and the pixel signal output from the second pixel, in which the second pixel has lower transmittance on an outer side of the pupil region in which the first pixel is capable of receiving light as compared with the transmittance of the pupil region.

BRIEF DESCRIPTION OF DRAWINGS

FIG. 4 is a partial cross-sectional view illustrating an example of a schematic structure of a pixel according to the first embodiment of the present disclosure.

FIGS. 5A and 5B are diagrams for explaining operation of an imaging device according to the first embodiment of the present disclosure.

MODE FOR CARRYING OUT THE INVENTION

Figure 1:
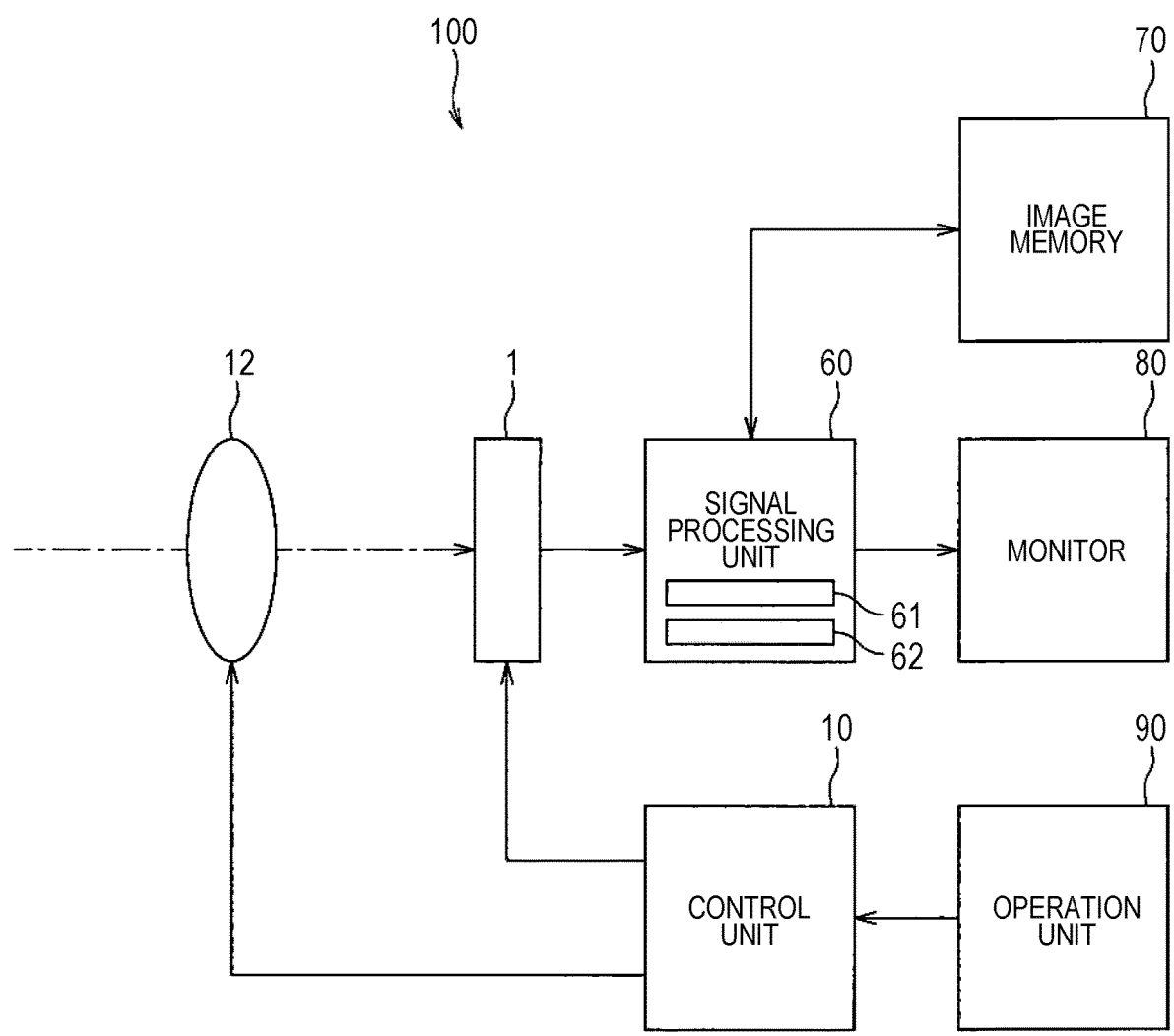
FIG. 1 is a schematic configuration diagram illustrating an example of a configuration of an imaging device according to a first embodiment of the present disclosure.

Hereinafter, embodiments of the present disclosure will be described with reference to the drawings. In the description of the drawings referred to in the following description, the same or similar parts are denoted by the same or similar reference numerals, and overlapping description will be omitted. However, it should be noted that the drawings are schematic, and the relationship between the thickness and the plane dimension, the ratio of the thickness of each device and each member, and the like are different from actual ones. Therefore, specific thicknesses and dimensions should be determined in consideration of the following description. Furthermore, it is needless to say that the drawings include portions having different dimensional relationships and ratios.

Furthermore, definitions of directions such as up and down in the following description are merely definitions for convenience of description, and do not limit the technical idea of the present disclosure. For example, it is needless to say that when an object is observed by being rotated by 90°, the up and down are converted into and read as right and left, and when the object is observed by being rotated by 180°, the up and down are inverted and read.

Note that the effects described in the present specification are merely examples and are not limited, and other effects may be provided.

First Embodiment (Configuration of Imaging Device)

FIG. 1 is a schematic configuration diagram illustrating an example of a configuration of an imaging device according to a first embodiment of the present disclosure.

An imaging device 100 according to the first embodiment can be applied to, for example, various electronic apparatuses such as a digital still camera, a digital video camera, a mobile phone with an imaging function, and other apparatuses having an imaging function. Furthermore, as illustrated in FIG. 1, the imaging device 100 includes an optical system 12, a solid-state imaging element 1, a control unit 10, a signal processing unit 60, an image memory 70, a monitor 80, and an operation unit 90.

The optical system 12 may include one or a plurality of lenses. The optical system 12 guides light from a subject to the solid-state imaging element 1 and forms an image on a pixel array unit 20 (illustrated in FIG. 2) of the solid-state imaging element 1. Note that the solid-state imaging element 1 may be a light receiving element that only receives light from the subject. Furthermore, the optical system 12 performs focus adjustment and drive control for the lens under the control of the control unit 10. Moreover, the optical system 12 sets an aperture to a designated aperture value under the control of the control unit 10.

The monitor 80 displays image data obtained by the signal processing performed by the signal processing unit 60. A user (for example, a photographing person) of the imaging device 100 can observe the image data from the monitor 80.

The control unit 10 includes a CPU, a memory, and controls driving of the solid-state imaging element 1 and controls the optical system 12 in response to an operational signal from the operation unit 90.

(Configuration of Solid-State Imaging Element)

Figure 2:
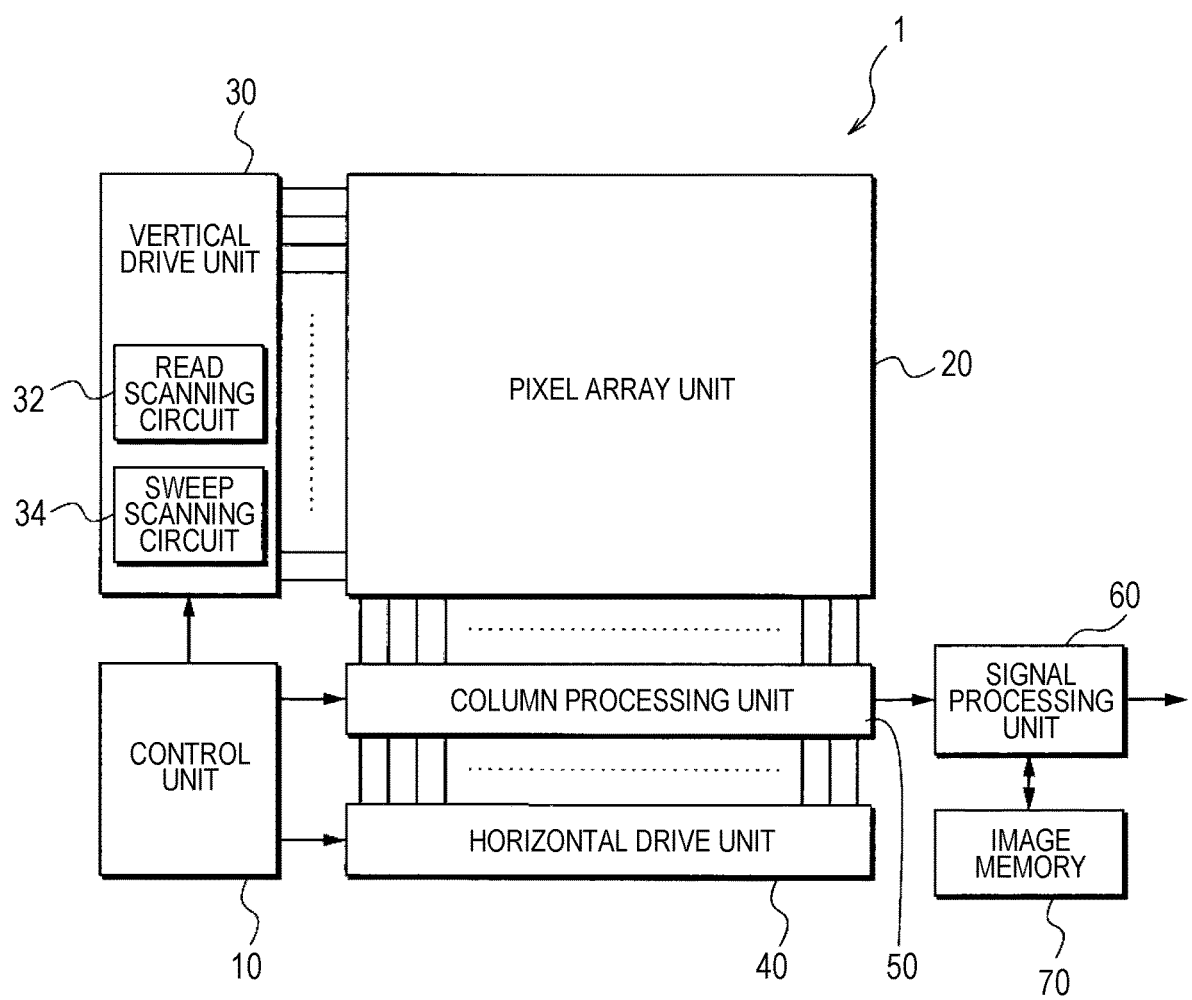
FIG. 2 is a diagram illustrating an example of a configuration of a solid-state imaging element according to the first embodiment of the present disclosure.

FIG. 2 is a block diagram illustrating an example of a configuration of the solid-state imaging element 1 described above. As illustrated in the drawing, the solid-state imaging element 1 includes, for example, a control unit 10, a pixel array unit 20, a vertical drive unit 30, a horizontal drive unit 40, and a column processing unit 50. Furthermore, the solid-state imaging element 1 may include a signal processing unit 60 and an image memory 70. The solid-state imaging element 1 may be configured as, for example, a system-on-a-chip (SOC), but is not limited thereto.

The control unit 10 may include a timing generator (not illustrated) that generates various timing signals. For example, the control unit 10 controls the operation of the vertical drive unit 30, the operation of the horizontal drive unit 40, and the operation of the column processing unit 50 in accordance with various timing signals generated by the timing generator on the basis of a clock signal supplied from the outside.

The pixel array unit 20 includes photoelectric conversion element groups disposed in an array form, which generate and accumulate charges according to the intensity of incident light. Some of a plurality of the photoelectric conversion elements may constitute one pixel. Each pixel typically includes a color filter and is configured to receive light of a color component corresponding to the color filter. As the arrangement of pixels, for example, a Quad arrangement or a Bayer arrangement is known, but the arrangement is not limited thereto. In the drawing, an up-and-down direction of the pixel array unit 20 is referred to as a column direction or a vertical direction, and a right-and-left direction is referred to as a row direction or a horizontal direction. Note that details of the configuration of the pixel in the pixel array unit 20 will be described later.

The vertical drive unit 30 includes a shift register and an address decoder (which are not illustrated). Under the control of the control unit 10, the vertical drive unit 30 drives, for example, a pixel group of the pixel array unit 20 in the vertical direction in order in units of rows. In the present disclosure, the vertical drive unit 30 may include a read scanning circuit 32 that performs scanning for reading a signal and a sweep scanning circuit 34 that performs scanning for sweeping (resetting) an unnecessary charge from the photoelectric conversion element.

The read scanning circuit 32 sequentially selectively scans the pixel group of the pixel array unit 20 in units of rows in order to read a signal based on the charge from each pixel.

The sweep scanning circuit 34 performs sweep scanning on a read row on which the read operation is to be performed by the read scanning circuit 32 earlier than the read operation by a time corresponding to the operation speed of an electronic shutter. A so-called electronic shutter operation is performed by sweeping (resetting) the unnecessary charge by the sweep scanning circuit 34. The electronic shutter operation means operation of sweeping a charge of a photoelectric conversion element 222 and newly starting exposure (start accumulating the charge).

A signal based on the charge read in the reading operation performed by the read scanning circuit 32 corresponds to the magnitude of energy of light that is incident after the immediately preceding read operation or the electronic shutter operation. Then, a period from a read timing in the immediately preceding read operation or a sweeping operation timing in the electronic shutter operation to a read timing in the current read operation is an accumulation time of the charge in the pixel.

The horizontal drive unit 40 includes a shift register and an address decoder (which are not illustrated). Under the control of the control unit 10, the horizontal drive unit 40 drives, for example, a pixel group of the pixel array unit 20 in the horizontal direction in order in units of columns. A signal based on the charge accumulated in the selected pixel is output to the column processing unit 50 when the vertical drive unit 30 and the horizontal drive unit 40 selectively drive the pixel.

The column processing unit 50 performs, for example, a predetermined processing such as correlated double sampling (CDS) processing on a signal output from each pixel group in the selected row of the pixel array unit 20. Specifically, the column processing unit 50 receives a differential signal output from each pixel group in the selected row, and obtains a level (potential) difference indicated by the differential signal to acquire a signal for each pixel of one row. Furthermore, the column processing unit 50 can remove fixed pattern noise from the acquired signal. The column processing unit 50 converts the signal subjected to such predetermined processing into a digital signal with an A/D conversion unit (not illustrated), and outputs the digital signal as a pixel signal.

The signal processing unit 60 is a circuit that has at least an arithmetic processing function and performs various signal processing such as an arithmetic processing on the pixel signal output from the column processing unit 50. The digital signal processor (DSP) is an aspect of the signal processing unit 60. The image memory 70 temporarily stores data necessary for such processing when the signal processing is performed in the signal processing unit 60. Note that the signal processing unit 60 may be configured to perform the entire arithmetic processing or a part of the arithmetic processing as described above in the column processing unit 50.

Moreover, although details will be described later, the signal processing unit 60 includes a defocus amount prediction processing unit 61 and a correction processing unit 62, as functions according to the first embodiment.

Figure 3:
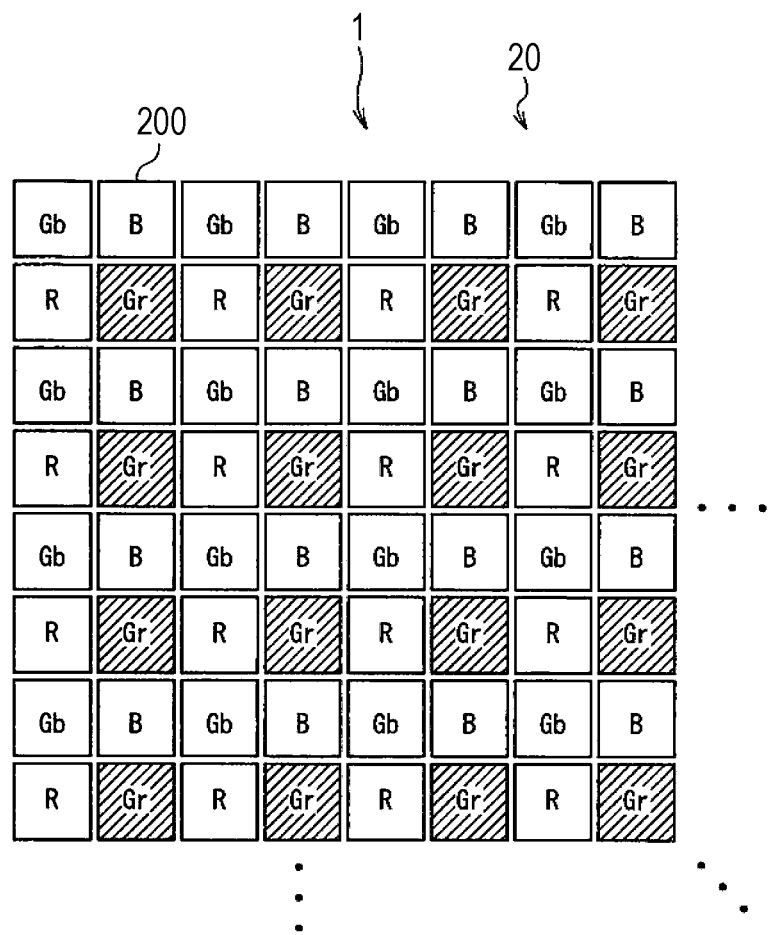
FIG. 3 is a diagram for explaining an example of arrangement of pixels of a pixel array unit according to the first embodiment of the present disclosure.

FIG. 3 is a diagram for explaining an example of arrangement of pixels of the pixel array unit 20 according to the first embodiment of the present disclosure. In the pixel array unit 20, each of a plurality of pixels 200 includes a color filter, and pixels respectively having color components corresponding to the color filters are arranged according to a predetermined array pattern. The color filter includes, for example, three types of filters of red, green, and blue, but is not limited thereto.

In the pixel array unit 20, four pixels 200 of a red pixel R, green pixels Gb and Gr, and a blue pixel B form one pixel block, and the pixel block groups are disposed in an array form.

(Cross-Sectional Structure of Pixel)

FIG. 4 is a partial cross-sectional view illustrating an example of a schematic structure of the pixel 200 according to the first embodiment of the present disclosure.

As illustrated in the drawing, the pixel 200 in the pixel array unit 20 includes, for example, an on-chip lens 201, a filter layer 210, a semiconductor substrate 220, and a wiring layer 230, and these layers are stacked in order. That is, the solid-state imaging element 1 (see FIG. 1) of the present disclosure is a back-side illumination imaging element in which the wiring layer 230 is provided on a surface opposite to a surface of the semiconductor substrate 220 to be irradiated with light.

The on-chip lens 201 condenses incident light on an irradiation surface of the semiconductor substrate 220 via the filter layer 210.

The filter layer 210 includes a color filter such that each pixel 200 receives light having a specific color component. The color filter includes, for example, filters of red, green, and blue, but is not limited thereto.

The semiconductor substrate 220 includes, for example, two photoelectric conversion elements 222A and 222B that receive incident light and accumulate a charge for each pixel 200.

The wiring layer 230 includes transfer gate electrodes 232A and 232B and a metal wiring 234. The transfer gate electrode 232A is electrically connected to the photoelectric conversion element 222A. The transfer gate electrode 232A is electrically connected to the photoelectric conversion element 222A. The transfer gate electrode 232B is electrically connected to the photoelectric conversion element 222B. A gate voltage is applied to the transfer gate electrodes 232A and 232B under the control of the control unit 10.

In the solid-state imaging element 1 having the above-described configuration, light is radiated from the back surface side of the semiconductor substrate 220, the radiated light is transmitted through the on-chip lens 201 and the color filter layer 210, and the transmitted light is subjected to photoelectric conversion by the photoelectric conversion elements 222A and 222B, such that a signal charge is generated. Then, the generated signal charge is output, as a pixel signal, through the metal wiring 234 via a pixel transistor including the transfer gate electrodes 232A and 232B, the pixel transistor being formed in the wiring layer 230.

Meanwhile, in the solid-state imaging element 1 having the above-described configuration, as illustrated in FIG. 5A, at the time of focusing by the optical system 12, for example, an A image that is the output of the photoelectric conversion element 222A and a B image that is the output of the photoelectric conversion element 222B are output so as to overlap each other. On the other hand, in the solid-state imaging element 1, as illustrated in FIG. 5B, at the time of front-focus by the optical system 12, for example, an A image that is the output of the photoelectric conversion element 222A and a B image that is the output of the photoelectric conversion element 222B are respectively output.

On the other hand, in the solid-state imaging element 1, as illustrated in FIG. 5(b), at the time of front-focus by the optical system 12, for example, an A image that is the output of the photoelectric conversion element 222A and a B image that is the output of the photoelectric conversion element 222B are respectively output.

In the example of FIG. 4, a photoelectric conversion region of the photoelectric conversion element 222A is intensively irradiated with incident light IL according to the incident angle of the incident light IL. At this time, ideally, when the output of the photoelectric conversion element 222A is 100, the output of the photoelectric conversion element 222B should be zero, but actually, a certain amount of output is also performed from the photoelectric conversion element 222B.

Comparative Example of Embodiment

Figure 6:
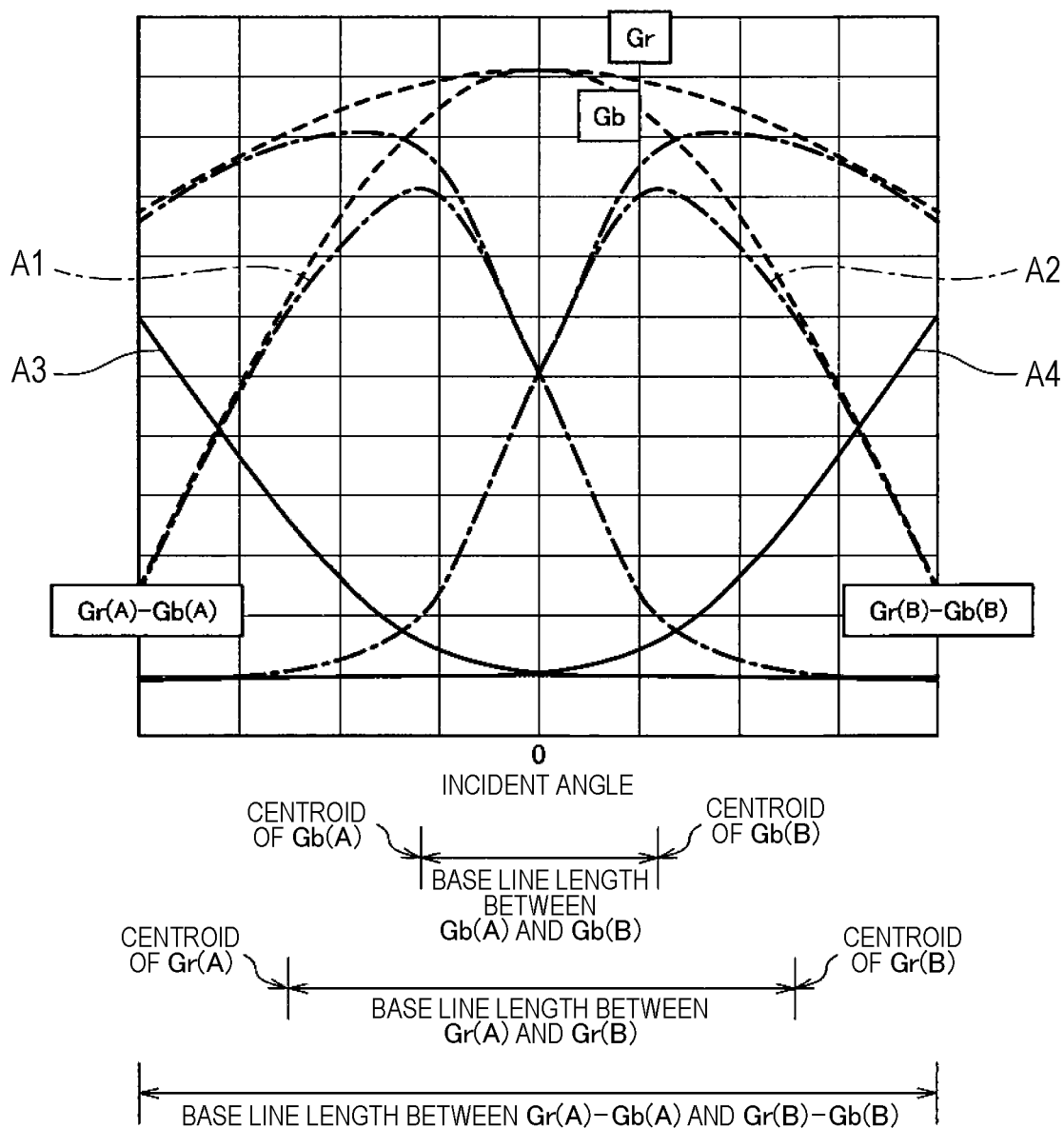
FIG. 6 is a diagram illustrating an output result according to an incident angle of light for each photoelectric conversion element for comparing the first embodiment with a comparative example.

FIG. 6 illustrates an output result according to the incident angle of light for each of the photoelectric conversion elements 222A and 222B. In FIG. 6, a difference between a green pixel Gr and a green pixel Gb will be described. A difference output Gr(A)–Gb(A) between the green pixel Gr and the green pixel Gb in the photoelectric conversion element 222A is represented by a one-dot chain line curve A1, and a difference output Gr(B)–Gb(B) between the green pixel Gr and the green pixel Gb in the photoelectric conversion element 222B is represented by a one-dot chain line curve A2.

In FIG. 6, the curve A1 corresponding to the output of the photoelectric conversion element 222A and the curve A2 corresponding to the output of the photoelectric conversion element 222B have the same output value when the incident angle is zero degrees, that is, when light is incident from directly above.

Here, a distance between a centroid in the output of the photoelectric conversion element 222A and a centroid in the output of the photoelectric conversion element 222B is set as a base line length. For example, the base line length between a green pixel Gb(A) and a green pixel Gb(B) is shortened, that is, a pupil region in the green pixel Gb is narrowed, such that it is effective at the time of large out-of-focus. For example, the base line length between a green pixel Gr(A) and a green pixel Gr(B) is increased, that is, a pupil region in the green pixel Gr is widened, such that it is effective at a low illuminance.

By obtaining the base line length between Gr(A)–Gb(A) and Gr(B)–Gb(B), the base line length becomes longer. Therefore, parallax is further obtained and it is advantageous in terms of AF accuracy. That is, even a slight defocus can be detected as a large phase difference. However, since the sensitivity around the incident angle of zero degrees is reduced, the influence on the image quality is large, and it is difficult to achieve both the imaging performance and the pupil division performance.

Solving Means of First Embodiment

In the first embodiment, for example, the outer side of the incident angle characteristic of the green pixel Gb (the outer side of the pupil region of the optical system 12) is intentionally deteriorated by the light-shielding film.

Figure 7:
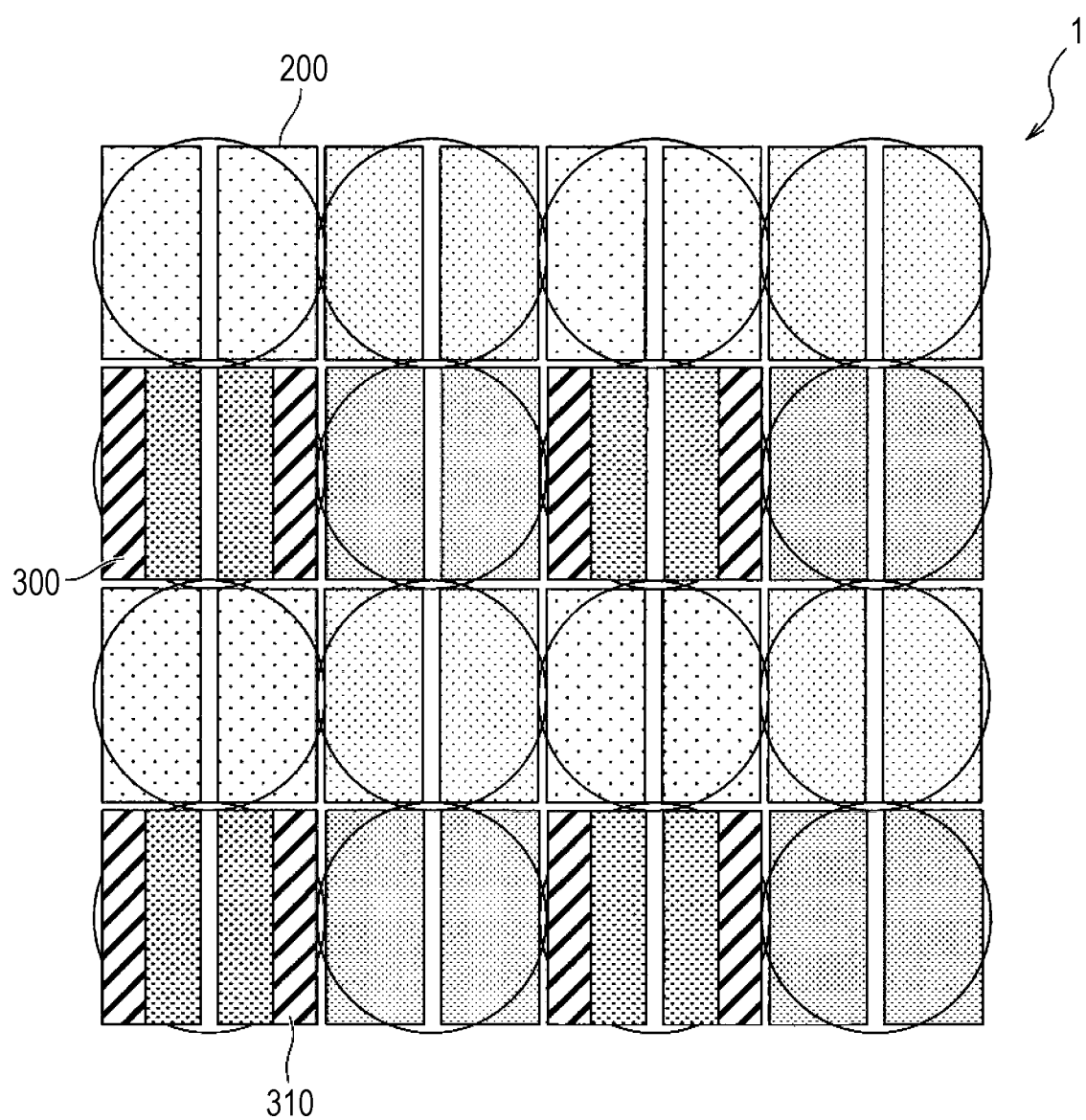
FIG. 7 is a diagram for explaining an example of arrangement of pixels of a pixel array unit including pixels with a light-shielding film in the first embodiment of the present disclosure.

FIG. 7 is a diagram for explaining an example of arrangement of the pixels 200 of the pixel array unit 20 including pixels 300 with a light-shielding film in the first embodiment of the present disclosure. In the pixel array unit 20, a light-shielding film 310 is formed on the outer side of the incident angle characteristic of each of the pixels 300 to be the green pixel Gb (the outer side of the pupil region of the optical system 12), and the incident light on the outer side of the pupil region of the optical system 12 is limited. The light-shielding film 310 has, for example, a quadrangular shape.

Returning to FIG. 6, a difference output Gr(A)–Gb(A) between the green pixel Gr and the green pixel Gb in the photoelectric conversion element 222A in the first embodiment is represented by a solid line curve A3, and a difference output Gr(B)–Gb(B) between the green pixel Gr and the green pixel Gb in the photoelectric conversion element 222B is represented by a solid line curve A4.

In the first embodiment, the light flux amount on the outer side of the optical system 12 is obtained by a difference from the output signal of the adjacent green pixel Gr.

(Sensitivity Difference Correction)

Figure 8:
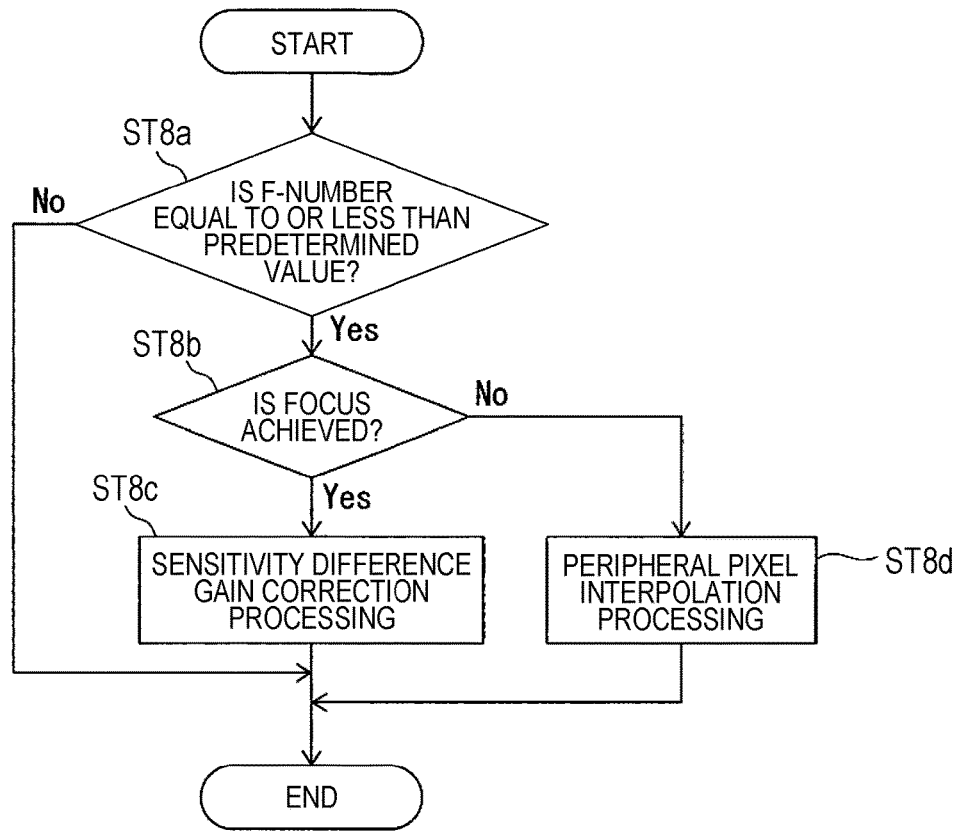
FIG. 8 is a flowchart illustrating a control procedure of a signal processing unit in a case where sensitivity difference correction is performed in the first embodiment of the present disclosure.

FIG. 8 is a flowchart illustrating a control procedure of the signal processing unit 60 in a case where sensitivity difference correction is performed.

The defocus amount prediction processing unit 61 included in the signal processing unit 60 predicts the light amount on the outer side of the pupil region of the optical system 12 on the basis of the output signal of the green pixel Gr and the output signal of the green pixel Gb.

The correction processing unit 62 included in the signal processing unit 60 corrects a pixel signal including an object in a predetermined imaging field of view obtained by the green pixel Gr and a pixel signal obtained by the green pixel Gb.

When the pixel signal is input from the solid-state imaging element 1, the signal processing unit 60 determines whether or not an aperture value (F-number) of the optical system 12 is equal to or less than a predetermined value (step ST8a). Here, in a case where it is determined that the aperture value of the optical system 12 is equal to or less than the predetermined value (Yes), the signal processing unit 60 determines whether or not focus is achieved (step ST8b).

Figure 9:
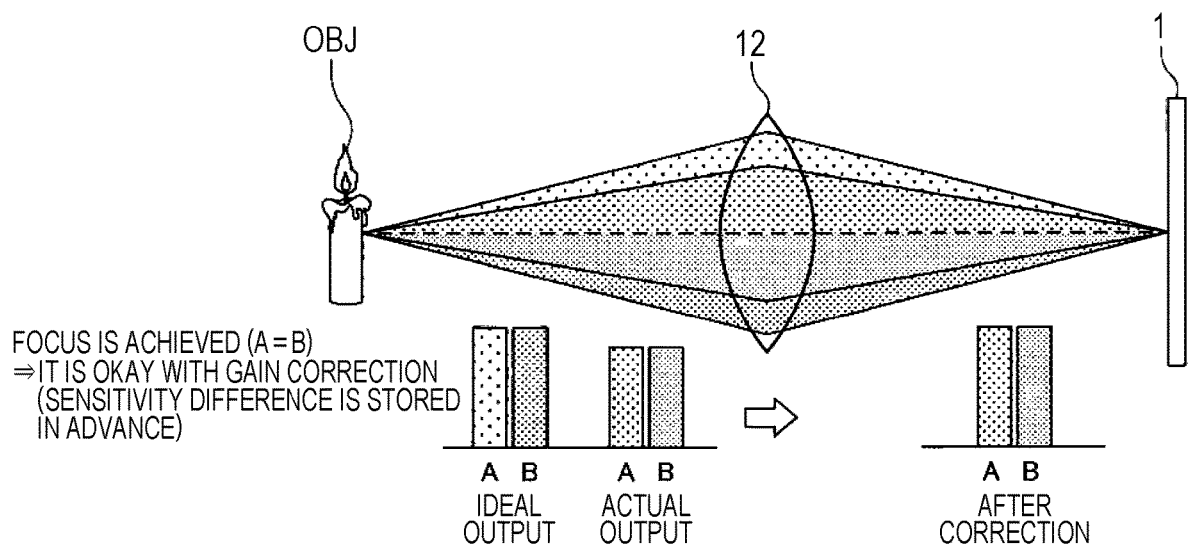
FIG. 9 is a diagram for explaining a state of correction processing in a case of being in focus in the first embodiment of the present disclosure.

"Focus is achieved" means that, as illustrated in FIG. 9, when incident light from an object OBJ (FIG. 9 illustrates, for example, a candle) is received by the solid-state imaging element 1 via the optical system 12, the output obtained by the photoelectric conversion element 222A and the output obtained by the photoelectric conversion element 222B are substantially the same.

In a case where focus is achieved (Yes), the signal processing unit 60 executes sensitivity difference gain correction processing (step ST8c). In this case, the sensitivity difference is stored in advance in the image memory 70.

Figure 10:
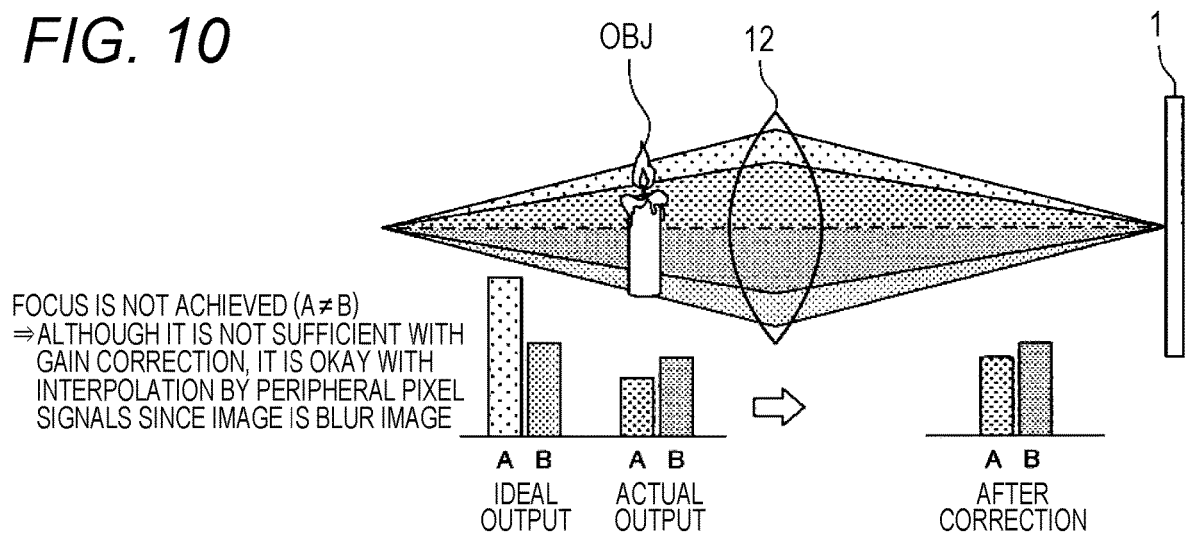
FIG. 10 is a diagram for explaining a state of correction processing in a case of not being in focus in the first embodiment of the present disclosure.

On the other hand, in a case where it is determined that focus is not achieved (No), the signal processing unit 60 executes peripheral pixel interpolation processing (step ST8d). Here, "focus is not achieved" means that, as illustrated in FIG. 10, since the object OBJ does not enter the pupil region of the optical system 12, when incident light from the object OBJ (FIG. 10 illustrates, for example, a candle) is received by the solid-state imaging element 1 via the optical system 12, the output obtained by the photoelectric conversion element 222A includes a "flame" of the "candle", the output obtained by the photoelectric conversion element 222A includes only "wax" of the "candle", and the outputs are different from each other.

Figure 11:
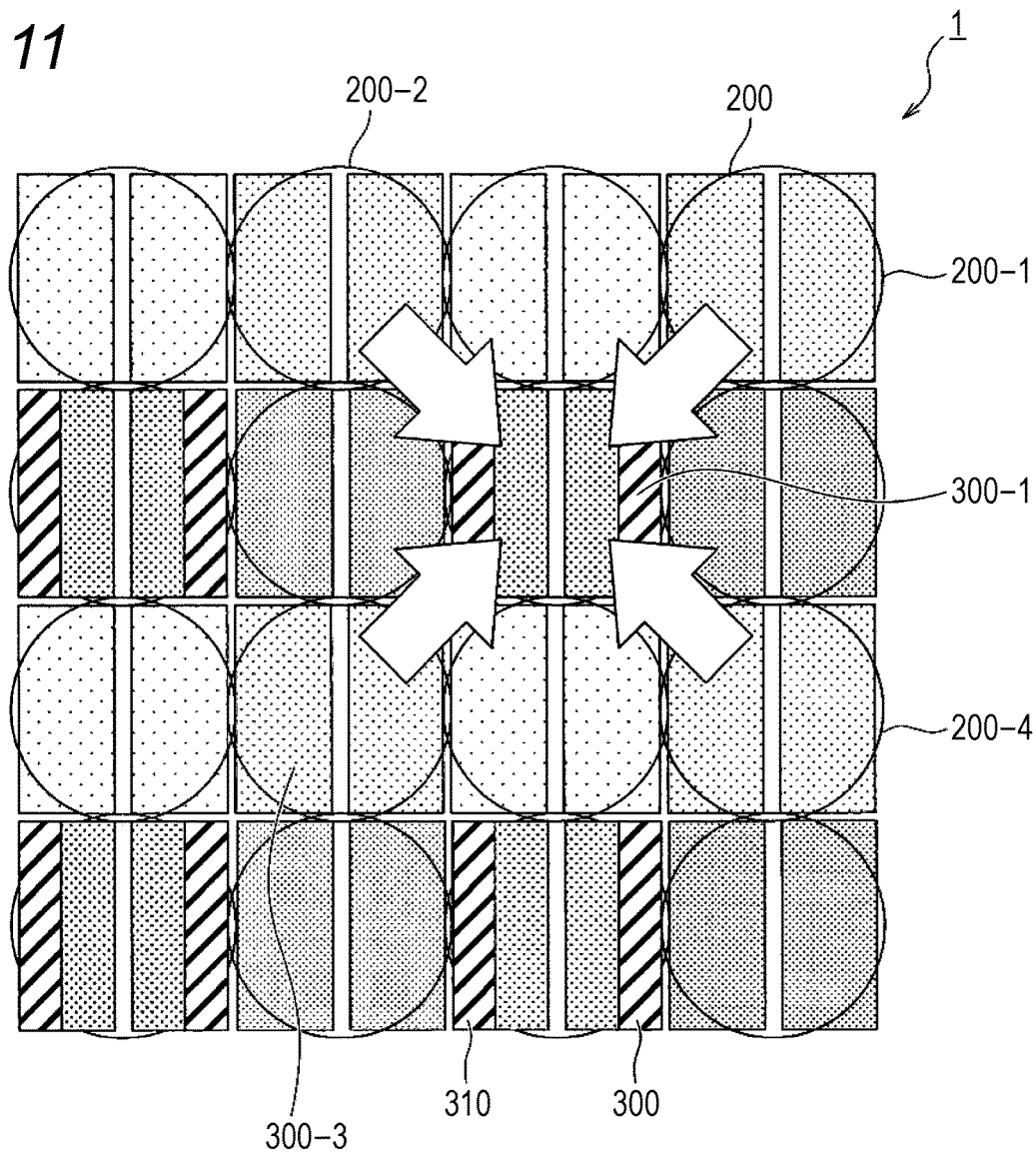
FIG. 11 is a diagram for explaining a state of interpolation processing with peripheral pixels in a case of not being in focus in the first embodiment of the present disclosure.

As illustrated in FIG. 11, the signal processing unit 60 calculates a signal corresponding to a virtual light-shielding film 310 on the basis of, for example, the signal of a pixel 300-1 and the signals of pixels 200-1 to 200-4 in the vicinity of the pixel 300-1. Specifically, for example, a value obtained by subtracting the pixel signal of the pixel 300-1 from the pixel signal of the pixel 200-1, or a value obtained by subtracting the pixel signal of the pixel 300-1 from the average value of the pixel signal of the pixel 200-1, the pixel signal of the pixel 200-2, the pixel signal of the pixel 200-3, and the pixel signal of the pixel 200-4 is calculated as a signal corresponding to the virtual light-shielding film 310, that is, a correction amount.

In the signal processing unit 60, interpolation processing on each pixel 300 is performed, and an image (captured image including the object OBJ) obtained by the pixel signal of the pixel 200 and the pixel signal obtained by the interpolation processing is recorded in the image memory 70.

Figure 12:
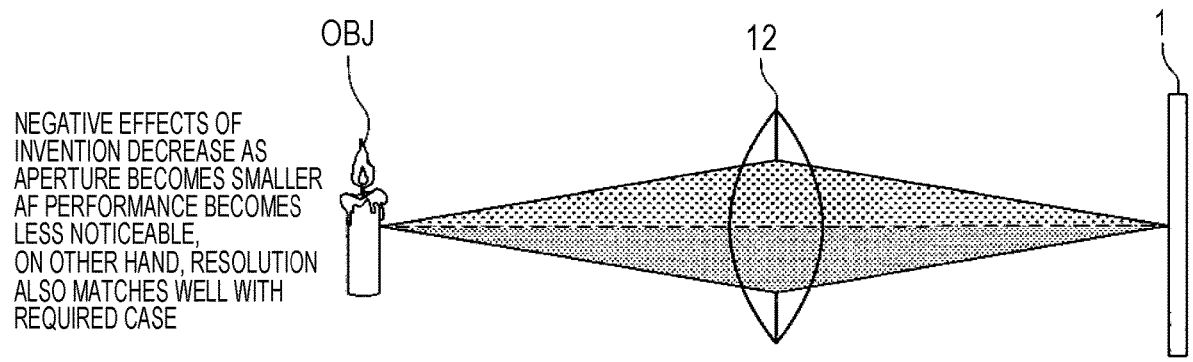
FIG. 12 is a diagram for describing a state of processing in a case where an aperture value of an optical system exceeds a predetermined value in the first embodiment of the present disclosure.

On the other hand, in the processing of step ST8a, in a case where the signal processing unit 60 determines that the F-number exceeds a predetermined value, the processing ends as it is. In this case, as illustrated in FIG. 12, the AF performance becomes less noticeable as the aperture becomes smaller, and on the other hand, the resolution also matches well with a required case.

Effects of First Embodiment

As described above, according to the first embodiment, for the pixel 300 corresponding to the green pixel Gb, the outer side of the pupil region of the optical system 12 is intentionally deteriorated by the light-shielding film 310, and the light flux on the outer side of the pupil region is obtained by the difference from the output signal of the pixel 200 corresponding to the adjacent green pixel Gr. As a result, it is possible to obtain a signal with high AF performance while suppressing image quality degradation.

Furthermore, according to the first embodiment, it is possible to predict the light amount on the outer side of the pupil region of the optical system 12 by subtracting the output signal of the pixel 300 corresponding to the green pixel Gb from the output signal of the pixel 200 corresponding to the green pixel Gr.

Furthermore, according to the first embodiment, on the basis of focus information, it is possible to perform gain correction processing in a case where the imaging field of view and the object OBJ are in focus, and it is possible to perform optimum correction processing according to the focus such that the interpolation processing by the peripheral pixels is executed in a case where the imaging field of view and the object OBJ are not in focus.

Moreover, according to the first embodiment, for example, when the correction processing based on the focus information is performed only in a case where the aperture value (F-number) of the optical system 12 is equal to or less than a predetermined value, unnecessary correction processing does not need to be performed.

Second Embodiment

Next, the second embodiment will be described. The second embodiment is a modification of the first embodiment, and will describe a case where the light-shielding film is circular.

Figure 13:
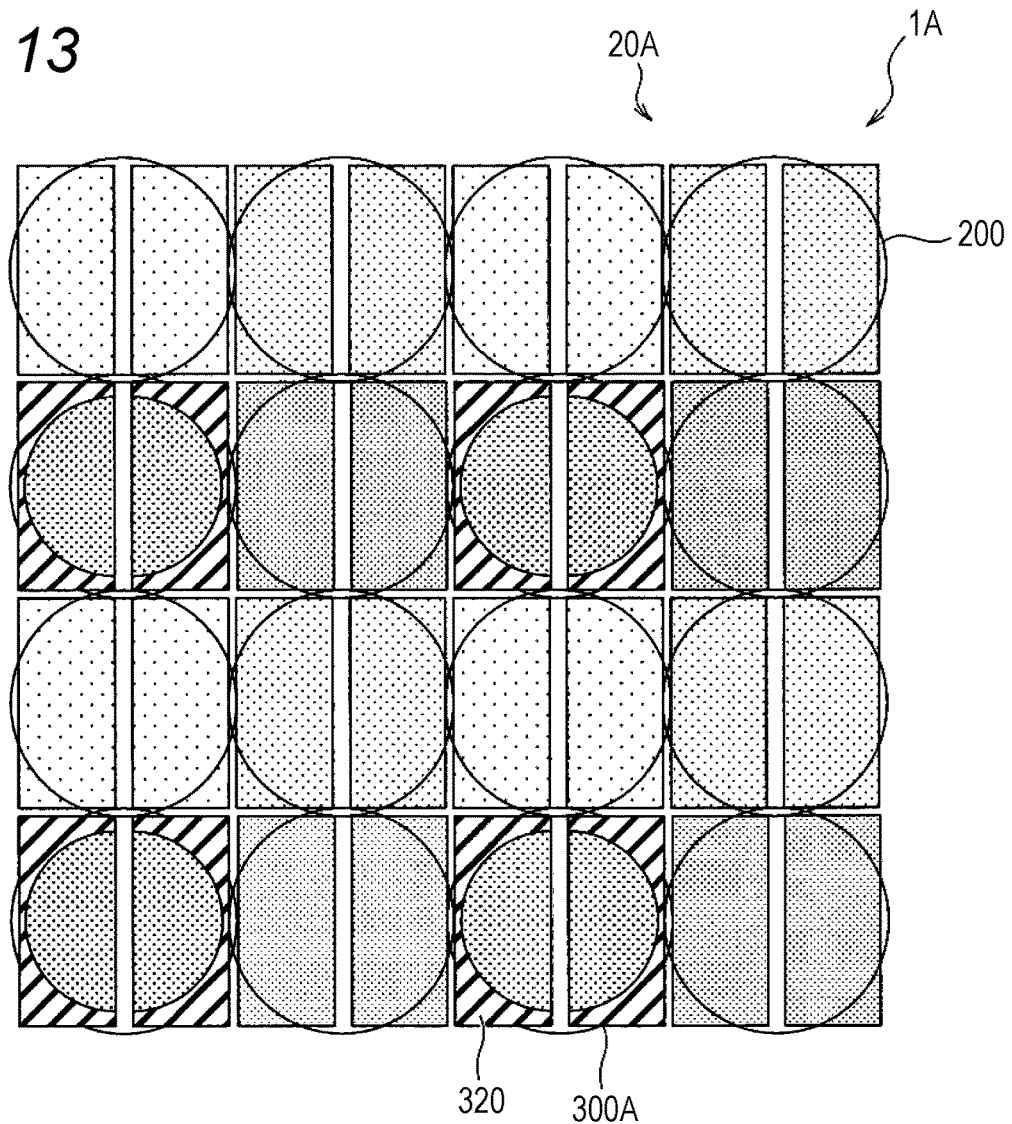
FIG. 13 is a diagram for explaining an example of arrangement of pixels of a pixel array unit including pixels with a light-shielding film in a solid-state imaging element according to a second embodiment of the present disclosure.

FIG. 13 is a diagram for explaining an example of arrangement of pixels 200 of a pixel array unit 20A including pixels 300A with a light-shielding film in a solid-state imaging element 1A according to the second embodiment. Note that in FIG. 13, the same components as those in FIG. 7 described above are denoted by the same reference signs, and detailed description thereof will be omitted.

As illustrated in FIG. 13, in the pixel array unit 20A, a circular light-shielding film 320 is formed on the outer side of the incident angle characteristic of each of the pixels 300A to be the green pixel Gb (the outer side of the pupil region of the optical system 12), and the incident light on the outer side of the pupil region of the optical system 12 is limited.

In the second embodiment, the light flux amount on the outer side of the optical system 12 is obtained by a difference from the output signal of the adjacent green pixel Gr.

Effects of Second Embodiment

As described above, also in the second embodiment, effects similar to those in the first embodiment can be obtained.

Third Embodiment

Next, the third embodiment will be described. The third embodiment is a modification of the first and second embodiments, and a case where photoelectric conversion elements disposed in two rows and two columns are provided for one on-chip lens 201, and the light-shielding film is circular will be described.

Figure 14:
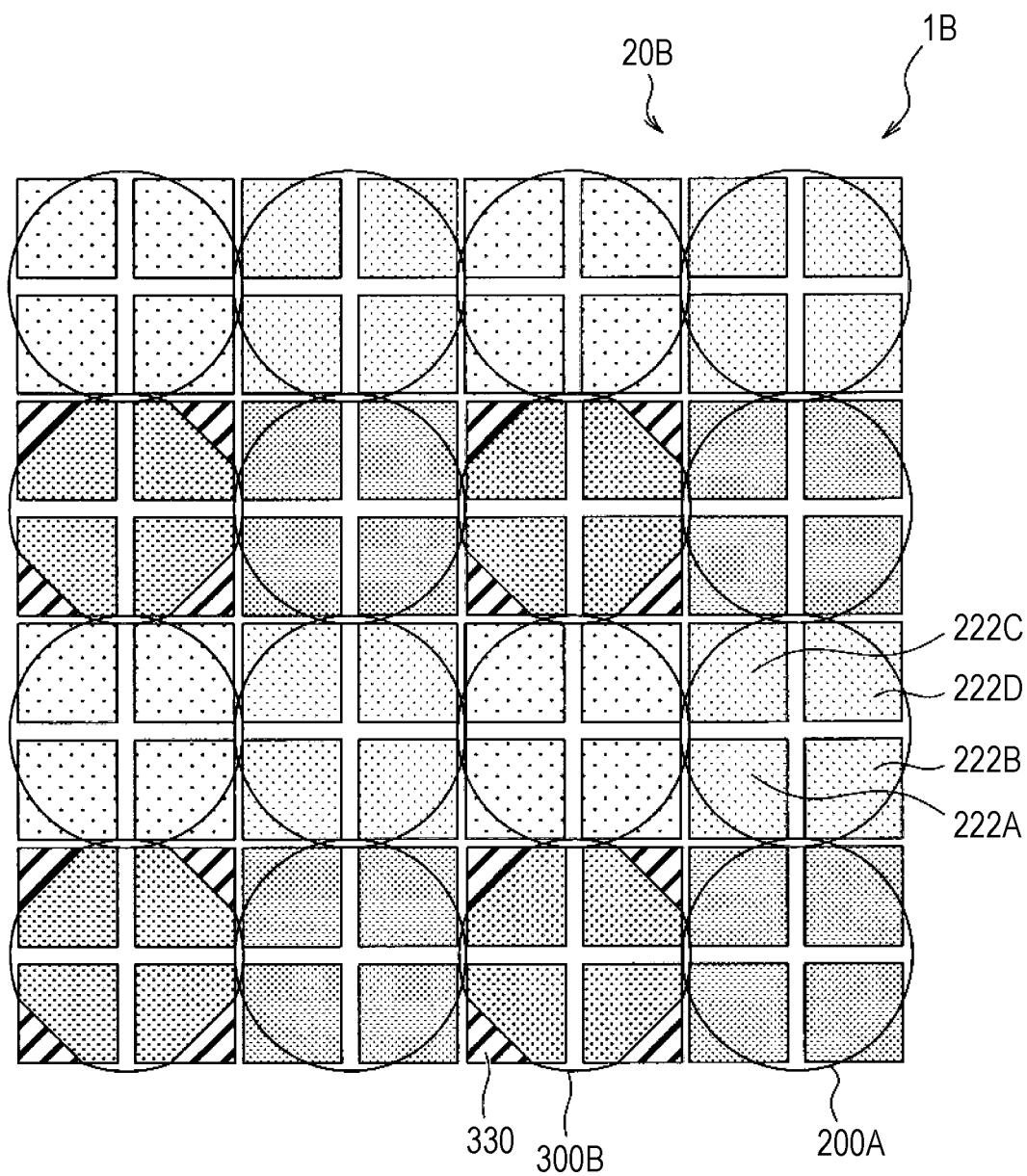
FIG. 14 is a diagram for explaining an example of arrangement of pixels of a pixel array unit including pixels with a light-shielding film in a solid-state imaging element according to a third embodiment of the present disclosure.

FIG. 14 is a diagram for explaining an example of arrangement of pixels 200A of a pixel array unit 20B including pixels 300B with a light-shielding film in a solid-state imaging element 1B according to the third embodiment. Note that in FIG. 14, the same components as those in FIG. 7 described above are denoted by the same reference signs, and detailed description thereof will be omitted.

As illustrated in FIG. 14, in the pixel array unit 20B, a light-shielding film 330 is formed on the outer side of the incident angle characteristic of each of the pixels 300B to be the green pixel Gb (the outer side of the pupil region of the optical system 12), and the incident light on the outer side of the pupil region of the optical system 12 is limited.

Each of the pixels 200A includes photoelectric conversion elements 222A, 222B, 222C, and 222D disposed in two rows and two columns for one on-chip lens 201. Each of the pixels 300B includes photoelectric conversion elements 222A, 222B, 222C, and 222D disposed in two rows and two columns for one on-chip lens 201.

In the third embodiment, the light flux amount on the outer side of the optical system 12 is obtained by a difference from the output signal of the adjacent green pixel Gr.

Effects of Third Embodiment

As described above, according to the third embodiment, the effects similar to those of the first embodiment can be obtained, and since the photoelectric conversion elements 222A, 222B, 222C, and 222D in two rows and two columns are disposed for one on-chip lens 201, it is possible to obtain phase difference detection information in both the row direction and the column direction.

Fourth Embodiment

Next, a fourth embodiment will be described. The fourth embodiment is a modification of the third embodiment, and two pixels are disposed between pixels to which a light-shielding film is applied.

Figure 15:
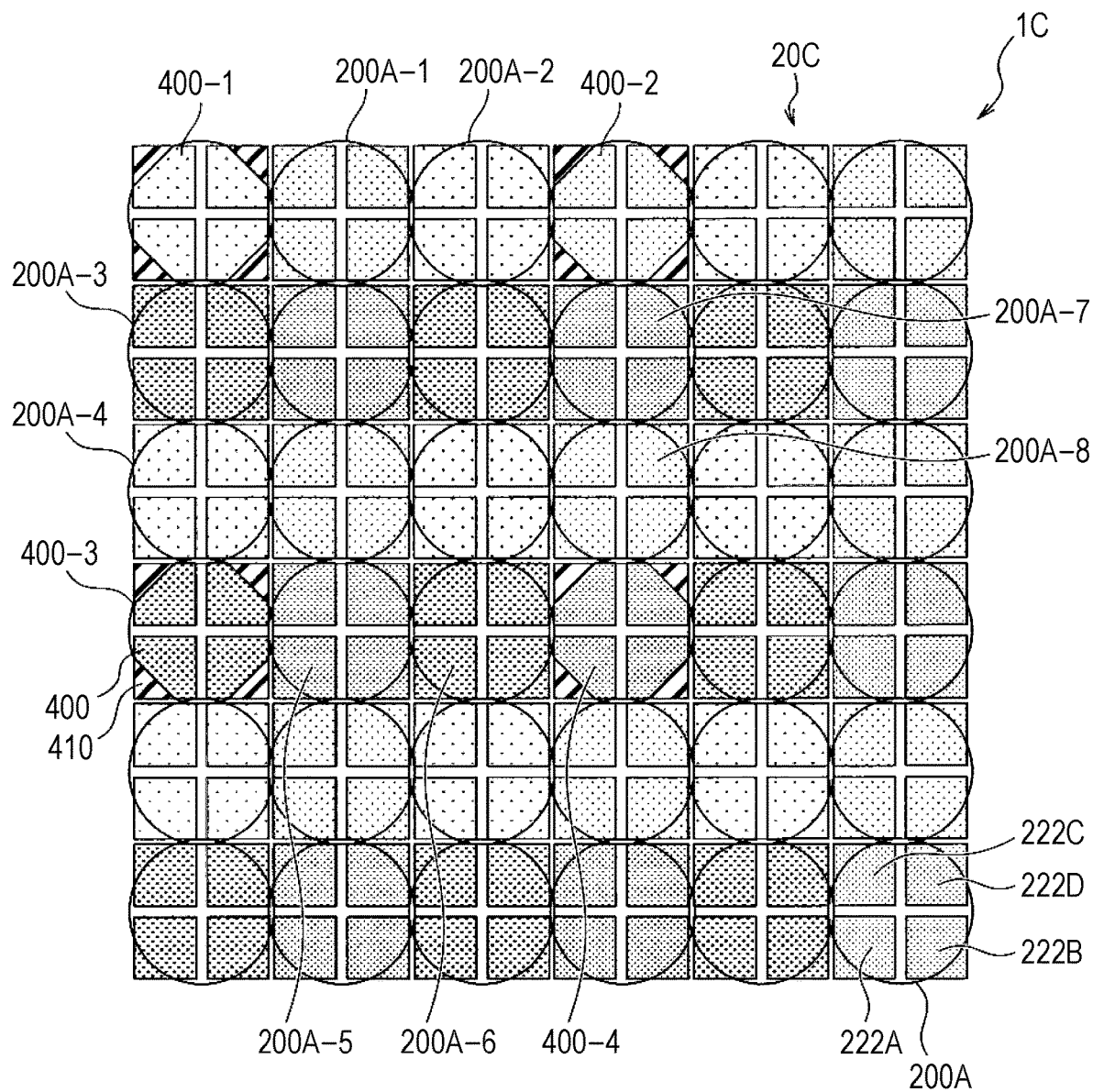
FIG. 15 is a diagram for explaining an example of arrangement of pixels of a pixel array unit including pixels with a light-shielding film in a solid-state imaging element according to a fourth embodiment of the present disclosure.

FIG. 15 is a diagram for explaining an example of arrangement of pixels 200A of a pixel array unit 20C including pixels 400 with a light-shielding film in a solid-state imaging element 1C according to the fourth embodiment. Note that in FIG. 15, the same components as those in FIG. 14 described above are denoted by the same reference signs, and detailed description thereof will be omitted.

As illustrated in FIG. 15, in the pixel array unit 20C, a light-shielding film 410 is formed on the outer side of the incident angle characteristic of a pixel 400-1 to be the red pixel R (the outer side of the pupil region of the optical system 12), and the incident light on the outer side of the pupil region of the optical system 12 is limited. Furthermore, in the pixel array unit 20C, the light-shielding film 410 is formed on the outer side of the incident angle characteristic of a pixel 400-2 to be the green pixel Gr, and the incident light on the outer side of the pupil region of the optical system 12 is limited. Furthermore, in the pixel array unit 20C, the light-shielding film 410 is formed on the outer side of the incident angle characteristic of a pixel 400-3 to be the green pixel Gb, and the incident light on the outer side of the pupil region of the optical system 12 is limited. Moreover, in the pixel array unit 20C, the light-shielding film 410 is formed on the outer side of the incident angle characteristic of a pixel 400-4 to be the blue pixel B, and the incident light on the outer side of the pupil region of the optical system 12 is limited.

A pixel 200A-1 to be the green pixel Gr and a pixel 200A-2 to be the red pixel R are disposed between the pixel 400-1 to be the red pixel R and the pixel 400-2 to be the green pixel Gr. A pixel 200A-3 to be the green pixel Gb and a pixel 200A-4 to be the red pixel R are disposed between the pixel 400-1 to be the red pixel R and the pixel 400-3 to be the green pixel Gb. A pixel 200A-5 to be the blue pixel B and a pixel 200A-6 to be the green pixel Gb are disposed between the pixel 400-3 to be the green pixel Gb and the pixel 400-4 to be the blue pixel B. A pixel 200A-7 to be the blue pixel B and a pixel 200A-8 to be the green pixel Gr are disposed between the pixel 400-2 to be the green pixel Gr and the pixel 400-4 to be the blue pixel B.

The signal processing unit 60 calculates a signal corresponding to a virtual light-shielding film 410 on the basis of, for example, the signal of the pixel 400-4 to be the blue pixel B and the signal of the pixel 200A corresponding to the blue pixel B in the vicinity of the pixel 400-4. Furthermore, the signal processing unit 60 calculates a signal corresponding to the virtual light-shielding film 410 on the basis of, for example, the signal of the pixel 400-1 to be the red pixel R and the signal of the pixel 200A corresponding to the red pixel R in the vicinity of the pixel 400-1. Moreover, the signal processing unit 60 calculates a signal corresponding to the virtual light-shielding film 410 on the basis of, for example, the signal of the pixel 400-2 to be the green pixel Gr and the signal of the pixel 200A corresponding to the green pixel Gr or green pixel Gb in the vicinity of the pixel 400-2.

Effects of Fourth Embodiment

As described above, according to the fourth embodiment, while the light-shielding film is applied only to the green pixel Gb in the first embodiment to third embodiment, the light-shielding film 410 can be applied to all colors of the red pixel R, the green pixel Gr, and the blue pixel B. Therefore, it is possible to cope with subjects of various colors. Note that at least one of the pixel 200A to be the red pixel R or the pixel 200A to be the green pixel Gr is only required to be disposed between the pixel 400-1 to be the red pixel R and the pixel 400-2 to be the green pixel Gr.

Other Embodiments

As described above, the present technology is described according to the first to fourth embodiments, but it should not be understood that the description and drawings forming a part of this disclosure limit the present technology. It will be apparent to those skilled in the art that various alternative embodiments, examples, and operation techniques can be included in the present technology when understanding the spirit of the technical content disclosed in the first to fourth embodiments. Furthermore, the configurations disclosed in the first to fourth embodiments can be appropriately combined within a range in which no contradiction occurs. For example, configurations disclosed in a plurality of different embodiments may be combined, or configurations disclosed in a plurality of different modification examples of the same embodiment may be combined.

Furthermore, it is not limited to the light-shielding film, and for example, a filter or the like may be formed with respect to the green pixel Gb such that the transmittance on the outer side of the pupil region is lower than the transmittance of the pupil region of the green pixel Gr.

Note that the present disclosure can also have the following configurations.

(1)

A light receiving element including:

a first pixel that includes a plurality of photoelectric conversion units configured to share a first on-chip lens, receive incident light from a pupil region of an optical system via the first on-chip lens, and perform photoelectric conversion; and a second pixel that includes a plurality of photoelectric conversion units configured to share a second on-chip lens, receive the incident light from the pupil region of the optical system via the second on-chip lens, and perform the photoelectric conversion, in which the second pixel has lower transmittance on an outer side of the pupil region in which the first pixel is capable of receiving light as compared with the transmittance of the pupil region.

(2)

The light receiving element according to (1), in which the second pixel includes a light-shielding film that limits the incident light on the outer side of the pupil region of the optical system.

(3)

The light receiving element according to (2),
in which the light-shielding film is circular or quadrangular.

(4)

The light receiving element according to (1),
in which a plurality of the first pixels and a plurality of the second pixels are provided, and
the plurality of the first pixels and the plurality of the second pixels are disposed in an array form.

(5)

The light receiving element according to (1),
in which the first pixel includes two photoelectric conversion units disposed in one row and two columns for the first on-chip lens, and
the second pixel includes two photoelectric conversion units disposed in one row and two columns for the second on-chip lens.

(6)

The light receiving element according to (1),
in which the first pixel includes four photoelectric conversion units disposed in two rows and two columns for the first on-chip lens, and
the second pixel includes four photoelectric conversion units disposed in two rows and two columns for the second on-chip lens.

(7)

The light receiving element according to (5) or (6),
in which the second pixel is provided so as to correspond to a green component.

(8)

The light receiving element according to (4),
in which in the plurality of the second pixels, at least one first pixel having a same color as those of the second pixels is disposed between adjacent second pixels.

(9)

An imaging device including a light receiving element, the light receiving element including:
a first pixel that includes a plurality of photoelectric conversion units configured to share a first on-chip lens, receive incident light from a pupil region of an optical system via the first on-chip lens, and perform photoelectric conversion; and
a second pixel that includes a plurality of photoelectric conversion units configured to share a second on-chip lens, receive the incident light from the pupil region of the optical system via the second on-chip lens, and perform the photoelectric conversion,
in which the second pixel has lower transmittance on an outer side of the pupil region in which the first pixel is capable of receiving light as compared with the transmittance of the pupil region.

(10)

The imaging device according to (9), further including
a prediction unit configured to predict a light amount on the outer side of the pupil region of the optical system on the basis of an output signal of the first pixel and an output signal of the second pixel.

(11)

The imaging device according to (9), further including
a correction unit configured to correct a pixel signal obtained by the first pixel and including an object in a predetermined imaging field of view and a pixel signal obtained by the second pixel.

(12)

The imaging device according to (11),
in which the correction unit obtains a correction amount for the pixel signal obtained by the first pixel and the pixel signal obtained by the second pixel on the basis of focus information.

(13)

The imaging device according to (11),
in which the correction unit obtains a correction amount for the pixel signal obtained by the first pixel and the pixel signal obtained by the second pixel on the basis of a focus value at the time of imaging.

(14)

The imaging device according to (12),
in which on the basis of the focus information, the correction unit executes gain correction processing in a case where the imaging field of view and the object are in focus, and executes interpolation processing by peripheral pixels in a case where the imaging field of view and the object are not in focus.

(15)

A correction processing method for a pixel signal of a light receiving element, the method including:
outputting pixel signals including an object in a predetermined imaging field of view, which are obtained by a first pixel that includes a plurality of photoelectric conversion units configured to share a first on-chip lens, receive incident light from a pupil region of an optical system via the first on-chip lens, and perform photoelectric conversion, and a second pixel that includes a plurality of photoelectric conversion units configured to share a second on-chip lens, receive the incident light from the pupil region of the optical system via the second on-chip lens, and perform the photoelectric conversion; and
correcting the pixel signal output from the first pixel and the pixel signal output from the second pixel,
in which the second pixel has lower transmittance on an outer side of the pupil region in which the first pixel is capable of receiving light as compared with the transmittance of the pupil region.

(16)

The correction processing method according to (15),
in which in the correcting the pixel signals, a correction amount for the pixel signal obtained by the first pixel and the pixel signal obtained by the second pixel is obtained on the basis of focus information.

(17)

The correction processing method according to (15),
in which in the correcting the pixel signals, a correction amount for the pixel signal obtained by the first pixel and the pixel signal obtained by the second pixel is obtained on the basis of a focus value at the time of imaging.

(18)

The correction processing method according to (16),
in which in the correcting the pixel signals, on the basis of the focus information, gain correction processing is executed in a case where the imaging field of view and the object are in focus, and interpolation processing by peripheral pixels is executed in a case where the imaging field of view and the object are not in focus.

REFERENCE SIGNS LIST

1, 1A, 1B, 1C Solid-state imaging element
10 Control unit
12 Optical system
20, 20A, 20B, 20C Pixel array unit 30 Vertical drive unit
32 Read scanning circuit
34 Sweep scanning circuit
40 Horizontal drive unit
50 Column processing unit
60 Signal processing unit
61 Defocus amount prediction processing unit
62 Correction processing unit
70 Image memory
80 Monitor
90 Operation unit
100 Imaging device
200, 200-1, 200-2, 200-3, 200-4, 200A, 200A-1, 200A-2, 200A-3, 200A-4, 200A-5, 200A-6, 200A-7, 200A-8, 300, 300-1, 300A, 300B, 400, 400-1, 400-2, 400-3, 400-4 Pixel
201 On-chip lens
210 Filter layer
220 Semiconductor substrate
222, 222A, 222B, 222C, 222D Photoelectric conversion element
230 Wiring layer
232A, 232B Transfer gate electrode
234 Metal wiring
310, 320, 330, 410 Light-shielding film

The invention claimed is:

1. A light receiving element, comprising:
a first pixel that includes a first plurality of photoelectric conversion units, wherein the first plurality of photoelectric conversion units is configured to:
share a first on-chip lens,
receive incident light from a pupil region of an optical system via the first on-chip lens, and
execute photoelectric conversion on the received incident light;
a second pixel that includes a second plurality of photoelectric conversion units, wherein the second plurality of photoelectric conversion units is configured to:
share a second on-chip lens,
receive the incident light from the pupil region of the optical system via the second on-chip lens, and
execute the photoelectric conversion on the received incident light,
wherein a transmittance of the second pixel, on an outer side of the pupil region in which the first pixel receives light, is lower as compared with a transmittance of the pupil region; and
a correction unit configured to:
obtain a first pixel signal from the first pixel and a second pixel signal from the second pixel, wherein the first pixel signal includes an object in an imaging field of view associated with the first pixel;
correct the first pixel signal and the second pixel signal; and
execute, based on focus information of the incident light, a gain correction process in a case where the imaging field of view and the object are in focus.

2. The light receiving element according to claim 1, wherein the second pixel further includes a light-shielding film configured to limit the incident light on the outer side of the pupil region of the optical system.

3. The light receiving element according to claim 2, wherein the light-shielding film is circular or quadrangular.

4. The light receiving element according to claim 1, further comprising
a plurality of first pixels including the first pixel and a plurality of second pixels including the second pixel, wherein
the plurality of first pixels and the plurality of second pixels are in an array form.

5. The light receiving element according to claim 4, wherein
at least one pixel that has a same color as that of the plurality of second pixels is between adjacent pixels of the plurality of second pixels.

6. The light receiving element according to claim 1, wherein
the first plurality of photoelectric conversion units includes two photoelectric conversion units,
the two photoelectric conversion units of the first pixel are in one row and two columns for the first on-chip lens,
the second plurality of photoelectric conversion units includes two photoelectric conversion units, and
the two photoelectric conversion units of the second pixel are in one row and two columns for the second on-chip lens.

7. The light receiving element according to claim 6, wherein the second pixel corresponds to a green component.

8. The light receiving element according to claim 1, wherein
the first plurality of photoelectric conversion units includes four photoelectric conversion units,
the four photoelectric conversion units of the first pixel are in two rows and two columns for the first on-chip lens,
the second plurality of photoelectric conversion units includes four photoelectric conversion units, and
the four photoelectric conversion units of the second pixel are in two rows and two columns for the second on-chip lens.

9. An imaging device, comprising:
a light receiving element including:
a first pixel that includes a first plurality of photoelectric conversion units, wherein the first plurality of photoelectric conversion units is configured to:
share a first on-chip lens,
receive incident light from a pupil region of an optical system via the first on-chip lens, and
execute photoelectric conversion on the received incident light;
a second pixel that includes a second plurality of photoelectric conversion units, wherein the second plurality of photoelectric conversion units is configured to:
share a second on-chip lens,
receive the incident light from the pupil region of the optical system via the second on-chip lens, and
execute the photoelectric conversion on the received incident light,
wherein a transmittance of the second pixel, on an outer side of the pupil region in which the first pixel receives light, is lower as compared with a transmittance of the pupil region; and
a correction unit configured to:
obtain a first pixel signal from the first pixel and a second pixel signal from the second pixel, wherein the first pixel signal includes an object in an imaging field of view associated with the first pixel;

correct the first pixel signal and the second pixel signal; and execute, based on focus information of the incident light, a gain correction process in a case where the imaging field of view and the object are in focus.

10. The imaging device according to claim 9, further comprising a prediction unit configured to predict a light amount on the outer side of the pupil region of the optical system based on an output signal of the first pixel and an output signal of the second pixel.

11. The imaging device according to claim 9, wherein the correction unit is further configured to obtain a correction amount for the first pixel signal and the second pixel signal based on the focus information.

12. The imaging device according to claim 11, wherein the correction unit is further configured to execute, based on the focus information, an interpolation process by peripheral pixels of the light receiving element in a case where the imaging field of view and the object are not in focus.

13. The imaging device according to claim 9, wherein the correction unit is further configured to obtain a correction amount for the first pixel signal and the second pixel signal based on a focus value at a time of imaging by the imaging device.

14. A correction processing method, comprising:

outputting a first pixel signal from a first pixel and a second pixel signal from a second pixel, wherein the first pixel and the second pixel are included in a light receiving element, the first pixel signal includes an object in an imaging field of view associated with the first pixel, the first pixel includes a first plurality of photoelectric conversion units, the first plurality of photoelectric conversion units is configured to:

share a first on-chip lens, receive incident light from a pupil region of an optical system via the first on-chip lens, and execute photoelectric conversion on the received incident light, and the second pixel includes a second plurality of photoelectric conversion units, wherein the second plurality of photoelectric conversion units is configured to:

share a second on-chip lens, receive the incident light from the pupil region of the optical system via the second on-chip lens, and execute the photoelectric conversion on the received incident light;

correcting the first pixel signal and the second pixel signal, wherein a transmittance of the second pixel, on an outer side of the pupil region in which the first pixel receives light is lower, as compared with a transmittance of the pupil region; and executing, based on focus information of the incident light, a gain correction process in a case where the imaging field of view and the object are in focus.

15. The correction processing method according to claim 14, further comprising:

obtaining a correction amount for the first pixel signal and the second pixel signal based on the focus information.

16. The correction processing method according to claim 15, further comprising:

executing, based on the focus information, interpolation processing by peripheral pixels of the light receiving element in a case where the imaging field of view and the object are not in focus.

17. The correction processing method according to claim 14, further comprising:

obtaining a correction amount for the first pixel signal and the second pixel signal based on a focus value at a time of imaging.

* * * * *